United States Patent
Balasubramanian

(10) Patent No.: US 10,467,625 B2
(45) Date of Patent: Nov. 5, 2019

(54) SYSTEM AND METHOD OF CARDHOLDER VERIFICATION

(71) Applicant: The Western Union Company, Englewood, CO (US)

(72) Inventor: Girish Balasubramanian, Fremont, CA (US)

(73) Assignee: The Western Union Company, Denver, CO (US)

( * ) Notice: Subject to any disclaimer, the term of this patent is extended or adjusted under 35 U.S.C. 154(b) by 1107 days.

(21) Appl. No.: 13/782,188

(22) Filed: Mar. 1, 2013

(65) Prior Publication Data

US 2014/0249946 A1 Sep. 4, 2014

(51) Int. Cl.
*G06Q 20/40* (2012.01)
*G06Q 20/20* (2012.01)

(52) U.S. Cl.
CPC ....... *G06Q 20/4016* (2013.01); *G06Q 20/206* (2013.01)

(58) Field of Classification Search
None
See application file for complete search history.

(56) References Cited

U.S. PATENT DOCUMENTS

| | | | | |
|---|---|---|---|---|
| 8,245,920 B1* | 8/2012 | Katyal et al. | | 235/380 |
| 8,280,809 B2* | 10/2012 | Wilkes | | 705/39 |
| 8,639,629 B1* | 1/2014 | Hoffman | | 705/67 |
| 8,768,838 B1* | 7/2014 | Hoffman | | 705/44 |
| 2011/0238510 A1* | 9/2011 | Rowen et al. | | 705/16 |
| 2013/0054469 A1* | 2/2013 | Agashe et al. | | 705/67 |
| 2013/0124412 A1* | 5/2013 | Itwaru | | 705/44 |
| 2014/0046785 A1* | 2/2014 | Jenkins | | 705/18 |
| 2014/0162598 A1* | 6/2014 | Villa-Real | | 455/411 |
| 2015/0084745 A1* | 3/2015 | Hertz et al. | | 340/10.3 |

* cited by examiner

*Primary Examiner* — Fateh M Obaid
(74) *Attorney, Agent, or Firm* — Kilpatrick Townsend & Stockton, LLP

(57) ABSTRACT

A card number and an address are requested from a customer at a POS device. An AVS system compares the customer-provided address against a billing address or record for the card that is maintained by a card issuer. If the address provided by the customer matches the billing address of record, a second card number is requested from customer. That second card number is sent to the AVS system and the billing address stored by the issuer for the second card number is also checked against the address provided by the customer.

20 Claims, 3 Drawing Sheets

SYSTEM AND METHOD OF CARDHOLDER VERIFICATION

BACKGROUND OF THE INVENTION

Card account numbers and related account information are sometimes stolen and used to conduct fraudulent transactions. The fraudulent use of card numbers (e.g., from credit, debit or other financial cards) is a significant problem in the case of on-line or "card-not-present" transactions, where a merchant (such as an on-line merchant operating e-commerce website) has no opportunity to view the card being used and take steps to reduce fraud, e.g., by asking a customer for proof of identity.

Various systems have been put in place to combat fraudulent use of cards. For example, an address verification system or service (AVS) may require the user of a card enter a billing address for the card account along with the card number. An authorization request is sent by the merchant to the card issuer, where the card number (and address) are checked against the issuer's database records (to make sure the billing address of record is the same as that provided by the customer). In other systems, the customer may also be asked to provide a card verification value or identifier (CVV) that may appear on the back of the card, to assure that the person in possession of the card number also has possession of the physical card (and can provide the identifier from the back of the card).

Even more complex (and more expensive) systems can be employed. For example, systems using extensive algorithms can be put in place by a merchant, issuer or card processor to analyze factors associated with a card transaction (e.g., lists of stolen or likely stolen credit card numbers, identifies of known thieves, websites or purchased products likely to be involved in fraud, and so forth), and calculate the likelihood that a transaction is fraudulent.

Stolen credit card numbers are often obtained from on-line scams or from hacking into systems storing card information, such that a thief may not only have a card number but also personal information of the card holder (such as an address). As a result, the existing systems for combating fraudulent card transactions (e.g., relying on both a card number and a billing address) are sometimes not effective. There has thus arisen the need for improvement of existing systems and techniques for combating use of stolen card numbers and related personal information.

BRIEF SUMMARY OF THE INVENTION

There is provided, in accordance with embodiments of the present invention, a network/system and method for authenticating or verifying the identity of an account holder. According to one aspect of the invention, the identity of the account holder using an account (associated with a card or similar presentation instrument) to conduct a transaction is verified by requiring a customer to provide personal information (such as address) associated with a first account number, and then also requiring the customer provide a second account number. The customer-provided personal information is compared to personal information stored by a card issuer for the first account number and personal information stored by a card issuer for the second account number.

In one embodiment, a method for preventing fraudulent card transactions includes receiving from a point-of-sale (POS) system, by one or more processors, a first account number for a first card being used by a customer to conduct a transaction; receiving from the POS system, by one or more of the processors, at least one piece of personal information provided by the customer; accessing, by one or more of the processors, one or more databases having personal information of customers stored in association with each of a plurality of account numbers, to retrieve personal information of the customer associated with the first account number; comparing, by one or more of the processors, the retrieved personal information associated with the first account number to the personal information provided by the customer; receiving, by one or more of the processors, a second account number for a second card of the customer; accessing, by one or more of the processors, one or more of the databases to retrieve personal information associated with the second account number; and comparing, by one or more of the processors, the retrieved personal information associated with the second account number to the personal information provided by the customer.

A more complete understanding of the present invention may be derived by referring to the detailed description of the invention and to the claims, when considered in connection with the Figures.

DETAILED DESCRIPTION OF THE INVENTION

Figure 1:
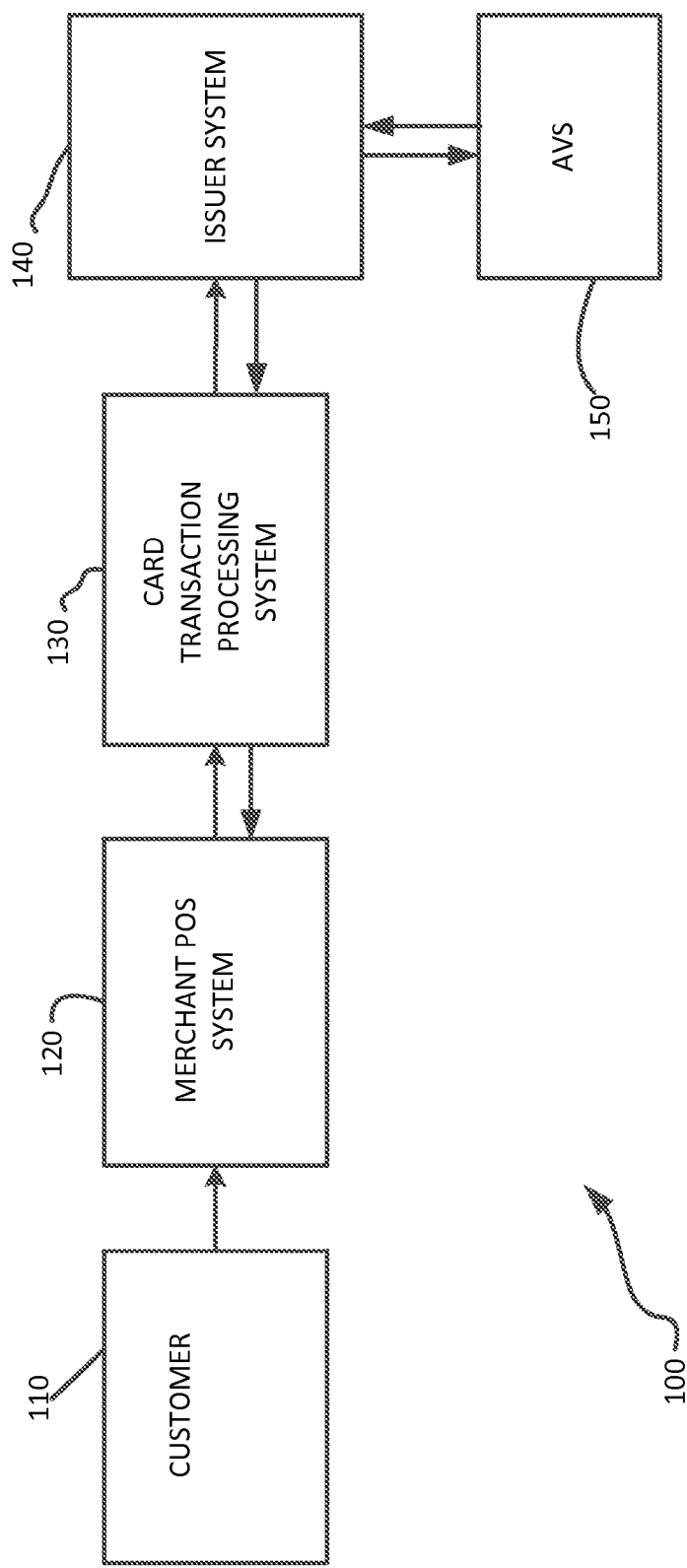
FIG. 1 is a general block diagram showing a card transaction network in accordance with one embodiment of the invention.

There are various embodiments and configurations for implementing the present invention. Generally, described embodiments provide systems and methods for enhanced cardholder verification using an address verification service (AVS) along with a second card number (in addition to a first, original card number) when conducting a transaction. Embodiments may be particularly useful in a "card-not-present" transaction conducted by a customer at a website that provides a point-of-sale (POS) function.

As an example, when conducting a transaction using AVS, a card number and a billing address are requested from a customer (cardholder) at a POS device. The address is checked against a billing address or record for the card that is maintained by the card issuer (stored by the issuer in conjunction with the card number account). In one embodiment, assuming that the address provided by the customer is verified against the issuer's records, a second card number is requested from customer. That second card number is sent to the AVS system and the address stored by the issuer for the second card number is also checked against the billing address provided by the customer. A match of the address stored for the second card number and the address provided by the customer indicates that the second card number is valid, that the customer is the cardholder of both cards, and that the customer is likely to be authentic.

A second card number is used to authenticate the customer because of the low likelihood that a thief has possession of two card numbers (and personal information) of the same customer. In general, where unauthorized access is obtained to a card number (such as by hacking into a merchant or financial system having that data, or by posing as a legitimate entity and fraudulently requesting card information from a customer) only a single card number is typically jeopardized. Fraudulent transactions may be conducted before the cardholder (or issuer) is aware that the card information and personal information has been obtained. While two physical cards might be lost or stolen at the same time (e.g., a person loses a wallet), the cardholder will often quickly know about the loss and cancel the cards involved. Thus, a system that relies on a cardholder having a credit card number, a billing address associated with the card number, and a second card number of the same customer (having the same billing address) will reduce the opportunity for fraudulent use of a card number.

In one embodiment, a customer is requested, during a card-not-present transaction at a website, to provide both a card number and a billing address. The merchant system providing the website acts as a merchant POS system, requiring entry of the requested information before generating a transaction request for approval of the transaction. The transaction request is sent through a card transaction processing network to the card issuer, so that the issuer can check the provided address against the address stored in the records of the issuer. If there is a match, the customer is requested to provide a second card number, and a supplemental transaction request is sent to the issuer, with the billing address (provided by the customer with the first card number) also checked against the address stored in the records of the issuer of the second card. The issuer for the second card may be the same as the issuer of the first card, or may be a different issuer.

If the address stored for the second card matches the provided billing address, it is likely that the customer is the rightful cardholder (of both the original card and the second card), and the transaction is approved or indicated as having low risk of fraud. The transaction against the first card is then processed, such as by the merchant requesting settlement of the transaction using the first card number.

Various alternative embodiments are possible. For example, while in one described embodiment two transaction requests are used (a second request for the second card is sent if the first card and address are approved), the first and second card numbers (and a billing address) may be sent as one, combined transaction request. If the issuers for the two cards are different, the card processing system (such as one maintained by an acquirer managing transactions for the merchant) can separate the transaction request into one request to the issuer of the first card and a second request to the issuer of the second card. The transaction processing system may return a message indicating whether one or both cards have addresses stored by the issuers that match the address provided by the customer.

In another embodiment, a transaction processing entity (such as an acquiring entity) may provide the AVS service and handle all transaction requests and transaction approvals with data provided by various issuers.

In another embodiment, the cardholder may have a correct billing address associated with both cards, but a transaction may not be approved (e.g., the cardholder is above the permitted credit limit for the first card). The processing system may be programmed to permit the card holder to use the second card rather than the first card for the transaction, as long as addresses are verified.

In some embodiments, personal information other than address information may be used for verifying the customer. Any personal information stored by an issuer (and likely to be common among plural cards issued to the same customer) can be used to verify that the second card number provided by a customer is associated with the same customer, and thus that customer is likely authentic. Examples of other personal information that could be used for verification may include (but are not limited to) birthdate, social security number, government issued ID (such as driver's license number), email address, phone number and any other personal information selected by the cardholder or the card issuer.

As used herein, the term "card" is meant to include broadly any type of presentation instrument having an associated account and used by a customer to conduct a transaction. Thus, by way of example, a card includes not only traditional financial cards (such as credit cards or debit cards), but also virtual cards, such as an electronic device (RFID device) having a stored account number that is accessed in order to conduct a transaction, or even a stand-alone card/account number (with no associated physical card or device) that is provided to a merchant in order to conduct a transaction. A card transaction broadly includes not only transactions conducted at a merchant POS system in order to purchase goods or services, but also other financial transactions, such as money transfer transactions.

Referring now to FIG. 1, an exemplary card network 100 according to one embodiment of the invention is illustrated. As is typical in present day card processing, a customer 110 (for example, using an internet enabled device, such as a personal computer or mobile data device) may provide a card number to a merchant point-of-sale (POS) system 120, along with a billing address or other personal information that may be used to verify the transaction. The merchant POS system passes the transaction information (card number, billing address, and amount of the transaction) in the form of a transaction request through a card transaction processing system 130, to an issuer system 140. The issuer may use an address verification service (AVS) system 150 for comparing the customer-provided billing address to the billing address stored in conjunction with the card number in issuer system 140. The issuer also determines whether to approve the transaction based on other data associated with the card and the transaction (e.g., whether the card has been reported stolen, whether the transaction amount is within the cardholder's credit limit, etc.). A transaction authorization response/reply message is returned though transaction processing system 130 to the merchant, indicating whether or not the transaction has been approved by the issuer. If approved, the merchant can request settlement of the transaction through the processing system 130, resulting in a credit to the merchant's bank account (transaction amount less processing fees) and a transaction charge against the cardholder's account at the issuer system 140.

Details of the network 100 and its various systems are generally described, by way of example, in U.S. Pat. No. 8,245,920, issued to Katyal et al on Aug. 21, 2012, and U.S. Pat. No. 8,280,809, issued to Wilkes on Oct. 2, 2012, each of which are hereby incorporated by reference. Furthermore, variations and further details of the network 100 will be apparent to those skilled in the art. For example, the card transaction processing system 130 may represent several different systems and subsystems, such a merchant payment processor (operated by the merchant or a third party that receives and processes card transactions on behalf of the merchant) and an acquirer and its systems (which receive and process transactions from many different payment processors and merchants before passing them on the issuer system 140). In addition, a card association and its systems (e.g., operated by VISA, MasterCard, and American Express) may be interposed between the transaction processing system 130 and the issuer system 140, for evaluating and facilitating transactions for various card issuers, such as banks and other financial institutions.

Figure 2:
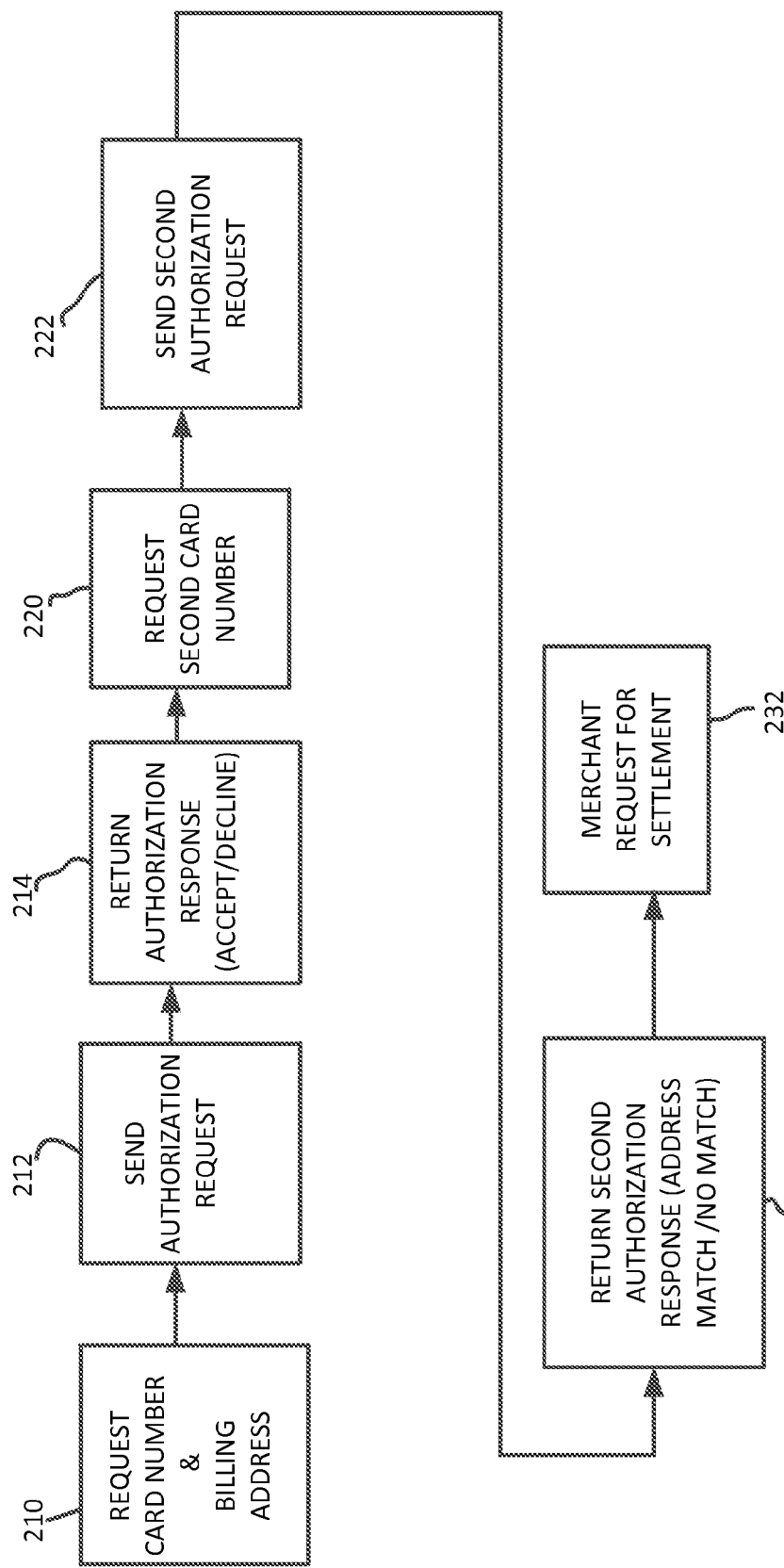
FIG. 2 is a flow diagram illustrating a process for cardholder verification in the network of FIG. 1, where a second credit card number is requested after a cardholder has been approved for using a first credit card number.

In accordance with one embodiment, to be described shortly in greater detail in conjunction with FIG. 2, when a card number and billing address are provided and an approval is returned by the issuer (indicating a match of the customer-provided address and the billing address of record at the issuer system 140), the merchant POS can request (for enhanced verification, and under the direction of the merchant, the transaction processing system 130 or the issuer system 140) that the customer provide a second card number. If the second card number is provided (and its associated account is found to have a billing address at the issuer system that matches the address earlier provided by the customer), then the customer conducting the transaction is deemed to be the likely owner/cardholder of both cards and the transaction is approved.

Also, while shown as an adjunct to the issuer system 140, the AVS system 140 could also be a function within the transaction processing system 130, assuming that the system 130 has access to billing addresses stored at the issuer system 140. Thus, in various embodiments, a system for authenticating an account holder and authorizing transactions might be implemented by either the transaction processing system 130 or the issuer system 140. Further, while a transaction authorization message returned by the issuer system 140 (in response to a transaction request from the POS system 120) typically provides a "approve/decline" indication, other types of risk assessment could be provided. For example, based on the transaction amount, customer-provided billing address, and other factors, the authorization message may provide a risk score for the transaction, with the merchant being able to assess the risk based on the risk score before deciding whether or not to complete the transaction.

Further, while the described embodiments are primarily concerned with card-not-present transactions conducted at a website (with the customer computing device being used to access the website providing a POS function), it should be appreciated that card present transactions, involving a physical POS device at a merchant location where credit card information is entered (either by the customer at a self-service terminal or by a clerk operating a merchant POS terminal) are also within the scope of the invention.

FIG. 2 illustrates a specific process for card verification in accordance with one embodiment of the invention. At step 210, the customer is requested to enter the card number of the card account being use to conduct the transaction (the card number appears on the customer's physical card, and is often, but not always, a number that includes, among other things, an issuer identifier and an account number). The customer is also requested to enter the billing address of the customer. At step 212, the merchant POS sends the card number and billing address (along with other transaction information) in the form of an authorization request to the transaction processing system 130 which in turns sends the authorization request to the issuer system 140. The issuer system returns an authorization message at step 214, after the AVS system checks the provided address and the issuer system determines whether the transaction itself is permissible. As mentioned earlier, an authorization response may include an "approve" or "decline" message or indication for the merchant. Also, there may be a response code, indicating not only whether the transaction is approved or declined, but also, if declined, the reason for being declined (e.g., invalid card number, incorrect billing address, credit limit exceeded, etc.). Alternatively, as mentioned earlier, the authorization response may include a risk score (in addition to or in lieu of an approve/decline indication), to give the merchant information with which to decide itself whether or not to complete the transaction.

While not illustrated in FIG. 2, an authorization response will typically include a transaction ID (e.g., generated by the transaction processing system), which may used by the merchant, transaction processing system, and issuer to identify and track the transaction.

In the described embodiment, if the transaction is approved, the merchant POS requests, at step 220, a second card number from the customer, in order to further verify the identity of the customer. The second card number is sent in the form of a second authorization request to the issuer at step 222. The second authorization request may, in some embodiments, include the same transaction ID returned at step 214, in order to link the transaction and previous authorization request to the second transaction request. For example, when the second transaction request is received at the issuer, the accompanying transaction ID will identify to the issuer the pending transaction so that the billing address previously provided by the customer may be accessed (e.g., using the transaction ID generated for the first authorization response). The issuer causes the AVS system 150 to check the address stored by the issuer against the earlier submitted customer-provided billing address. If the customer-provided billing address matches the address stored by the issuer for the second card, then the second card is verified as belonging to the same customer as the original card, and the issuer returns (through the transaction processing system 130) a second authorization response at step 230, indicating the second card as verified (a match of the customer-provided billing address to the address stored by the issuer for the second card). If the transaction is authorized (second authorization response indicates an address match), the merchant may request settlement of the transaction against the first card at step 232 using, for example, the transaction ID generated in response to the first authorization request.

Optionally, if the first authorization message (at step 214) indicates the transaction is to be declined, but not due to the authentication of the cardholder (e.g., a response code indicates that the cardholder has reached the credit limit), the merchant POS system 120 might still request a second card number for the customer, and assuming verification by matching the address associated with the second card, the customer may be asked whether the customer would like to use the second card in completing the transaction. In one embodiment, the transaction amount may be included in the second authorization request at step 220 to make sure that the transaction amount would be permissible (in addition to checking the address associated with the second card). In such case, a new, unique transaction ID associated with the second authorization request (based on the transaction now using the second card number) may be used for completing the transaction rather that the transaction ID generated in connection with the first authorization request.

As mentioned earlier, in some embodiments a customer may be asked for the second card number in advance of sending the first transaction request at step 212, and a transaction request having both card numbers is processed by the transaction processing system, which will direct the transaction request to one issuer (if both cards are from the same issuer), or split the transaction request into two messages, sending one to the issuer of the first card and the other to the issuer of the second card.

Also, the customer may optionally be asked to provide a card verification value with either or both the first card or the second card. The use of the CVV adds additional assurance that the customer providing the CVV is likely in physical possession of the card.

It should be noted that AVS systems would not necessarily require a perfect match in order to accept a card transaction. For example, AVS systems typically provide reason codes in a transaction authorization response that indicate the degree of match. Thus, a perfect match might be indicated (e.g., both a street address and a zip code match), or a match of only part of an address (e.g., either a zip code or the street address). Typically, a merchant decides how much of a match (and hence risk) to accept, and the same would hold true for the method of FIG. 2. For example, the transaction processor or merchant could provide an algorithm, based on the degree of match for both the first card and the second card, to determine whether to accept or decline a transaction.

In addition, if both the first card and the second card have been authenticated using the process of FIG. 2, merchants and processors can have greater confidence that a transaction conducted using either card is in fact authenticate (at least for a reasonable period of time after authentication of both cards). Based on the authentication of both cards, a card issuer could, among other things, increase the credit limits on the cards and therefore increase the utility or value of the cards to the cardholder, due to a perceived lower risk associated with the transactions using the cards. A card issuer might make the increased credit limit indefinite or might increase the credit limit for a specific period of time (e.g., one month, to take into account the chance of possible loss of cards or card information over time after authentication of both cards).

Figure 3:
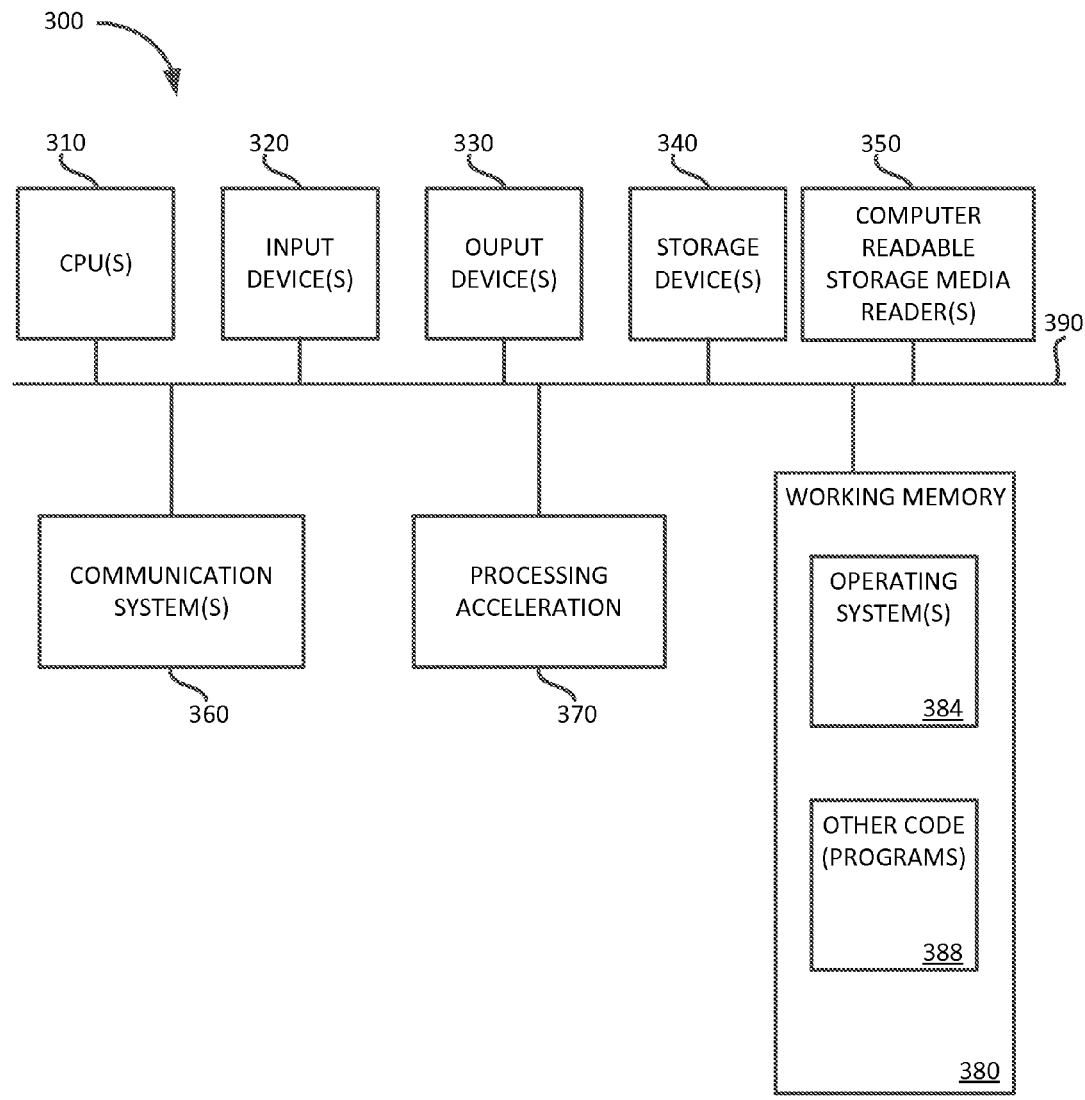
FIG. 3 is a block diagram illustrating an exemplary computer system upon which embodiments of the present invention may be implemented.

FIG. 3 is a block diagram illustrating an exemplary computer system upon which embodiments of the present invention may be implemented. This example illustrates a computer system 300 such as may be used, in whole, in part, or with various modifications, to provide the functions of the merchant POS system 120 and card transaction processing system 130, as well as other components and functions of the invention described herein.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage devices 340, representing remote, local, fixed, and/or removable storage devices and storage media for temporarily and/or more permanently containing computer-readable information, and one or more storage media reader(s) 350 for accessing the storage device(s) 340. By way of example, storage device(s) 340 may be disk drives, optical storage devices, solid-state storage device such as a random access memory ("RAM") and/or a read-only memory ("ROM"), which can be programmable, flash-updateable or the like.

The computer system 300 may additionally include a communications system 360 (e.g., a modem, a network card—wireless or wired, an infra-red communication device, a Bluetooth™ device, a near field communications (NFC) device, a cellular communication device, etc.) The communications system 360 may permit data to be exchanged with a network, system, computer, mobile device and/or other component as described earlier. The system 300 also includes working memory 380, which may include RAM and ROM devices as described above. In some embodiments, the computer system 300 may also include a processing acceleration unit 370, which can include a digital signal processor, a special-purpose processor and/or the like.

The computer system 300 may also comprise software elements, shown as being located within a working memory 380, including an operating system 384 and/or other code 388. Software code 388 may be used for implementing functions of various elements of the architecture as described herein. For example, software stored on and/or executed by a computer system, such as system 300, can be used in implementing the process seen in FIG. 2.

It should be appreciated that alternative embodiments of a computer system 300 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the merchant POS system 120 and the card transaction processing system 130 may each be implemented by a single system having one or more storage device and processing elements. Alternatively, each may be implemented by plural systems, with their respective functions distributed across different systems either in one location or across a plurality of linked locations.

Moreover, while the various flows and processes described herein (e.g., the flow illustrated in FIG. 2) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method comprising:
   receiving, from a first device a request for an internet-based transaction comprising a first account number associated with a user of the first device, wherein the first account number is associated with a first payment device;
   receiving, from the first device, account information associated with the first account number, the account information comprising at least one piece of personal information associated with the user, wherein the piece of personal information includes a first billing address associated with the user;

identifying, based at least in part on the first account number, a first database system, the first database system being provided by an issuer of the first payment device;

transmitting, the first account number and the account information associated with the first account number to the first database system;

receiving, a first authentication response indicating that previously stored account information associated with the first account number corresponds to the transmitted account information associated with the first account number;

in response to receiving the first authentication response, transmitting, to the first device, a request for a second account number and account information associated with the second account number, wherein the second account number is associated with a second payment device;

identifying, based at least in part on the second account number, a second database system, the second database system being distinct from the first database system and the second database system being provided by an issuer of the second payment device, the issuer of the first payment device being distinct from the issuer of the second payment device;

transmitting, the second account number and the account information associated with the second account number to the second database system, wherein the account information associated with the second account number includes a second billing address associated with the user;

receiving, a second authentication response indicating that previously stored account information associated with the second account number corresponds to the transmitted account information associated with the second account number; and authenticating, based at least in part on the first authentication response and the second authentication response, the user of the first device.

2. The method of claim 1, wherein the first account number is associated with a first payment account and the second account number is associated with a second payment account.

3. The method of claim 2, wherein the first payment account is utilized for payment for the internet-based transaction and the second payment account is not utilized for payment for the internet-based transaction.

4. The method of claim 2, wherein the first payment account and second payment account are associated with different credit cards.

5. The method of claim 2, wherein the first payment account and second payment account are associated with different debit cards.

6. The method of claim 1, wherein the first authentication response indicating if a payment associated with the first account number is authorized for the internet-based transaction.

7. The method of claim 1, wherein the first authentication response indicates a risk score for the internet-based transaction.

8. The method of claim 1, wherein a merchant associated with the internet-based transaction does not physically have access to a credit card associated with first account number or a credit card associated with the second account number during the internet-based transaction.

9. The method of claim 1, wherein the first billing address and the second billing address are a same billing address.

10. The method of claim 1, wherein the at least one piece of personal information comprises an image of a government issued identification.

11. A non-transitory computer-readable storage medium having stored thereon instructions for causing at least one computer system to authenticate a user for an internet-based transaction, the instructions comprising:

receiving, from a first device, a request for an internet-based transaction comprising a first account number associated with a user of the first device, wherein the first account number is associated with a first payment device;

receiving, from the first device, account information associated with the first account number, the account information comprising at least one piece of personal information associated with the user, wherein the piece of personal information includes a first billing address associated with the user;

identifying, based at least in part on the first account number, a first database system;

transmitting, the first account number and the account information associated with the first account number to the first database system;

receiving, a first authentication response indicating that previously stored account information associated with the first account number corresponds to the transmitted account information associated with the first account number;

in response to receiving the first authentication response, transmitting, to the first device, a request for a second account number and account information associated with the second account number, wherein the second account number is associated with a second payment device;

identifying, based at least in part on the second account number, a second database system, the second database system being distinct from the first database system and the second database system being provided by an issuer of the second payment device, the issuer of the first payment device being distinct from the issuer of the second payment device;

transmitting, the second account number and the account information associated with the second account number to the second database system, wherein the account information associated with the second account number includes a second billing address associated with the user;

receiving, a second authentication response indicating that previously stored account information associated with the second account number corresponds to the transmitted account information associated with the second account number; and authenticating, based at least in part on the first authentication response and the second authentication response, the user of the first device.

12. The non-transitory computer-readable storage medium of claim 11, wherein the first account number is associated with a first payment account and the second account number is associated with a second payment account.

13. The non-transitory computer-readable storage medium of claim 12, wherein the first payment account is utilized for payment for the internet-based transaction and the second payment account is not utilized for payment for the internet-based transaction.

14. The non-transitory computer-readable storage medium of claim 12, wherein the first payment account and second payment account are associated with different credit cards.

15. The non-transitory computer-readable storage medium of claim 12, wherein the first payment account and second payment account are associated with different debit cards.

16. The non-transitory computer-readable storage medium of claim 11, wherein the first authentication response indicating if a payment associated with the first account number is authorized for the internet-based transaction.

17. The non-transitory computer-readable storage medium of claim 11, wherein the first authentication response indicates a risk score for the internet-based transaction.

18. The non-transitory computer-readable storage medium of claim 11, wherein a merchant associated with the internet-based transaction does not physically have access to a credit card associated with first account number or a credit card associated with the second account number during the internet-based transaction.

19. The non-transitory computer-readable storage medium of claim 11, wherein the first billing address and the second billing address are a same billing address.

20. The non-transitory computer-readable storage medium of claim 11, wherein the at least one piece of personal information comprises an image of a government issues identification.

* * * * *